United States Patent
Ochiai

(10) Patent No.: US 7,792,807 B2
(45) Date of Patent: Sep. 7, 2010

(54) PROCESSING APPARATUS, DATA PROCESSING METHOD, PROGRAM FOR IMPLEMENTING THE METHOD, AND STORAGE MEDIUM

(75) Inventor: Masato Ochiai, Kanagawa (JP)

(73) Assignee: Canon Kabushiki Kaisha (JP)

(\*) Notice: Subject to any disclaimer, the term of this patent is extended or adjusted under 35 U.S.C. 154(b) by 325 days.

(21) Appl. No.: 10/846,866

(22) Filed: May 14, 2004

(65) Prior Publication Data
US 2004/0230561 A1     Nov. 18, 2004

(30) Foreign Application Priority Data
May 14, 2003   (JP) .................. 2003-136147

(51) Int. Cl.
*G06F 7/00* (2006.01)
(52) U.S. Cl. .................................. 707/705; 712/32
(58) Field of Classification Search ............... 707/705, 707/999.103; 712/32
See application file for complete search history.

(56) References Cited

U.S. PATENT DOCUMENTS

| | | | | |
|---|---|---|---|---|
| 6,088,737 A * | 7/2000 | Yano et al. | ............... | 709/235 |
| 6,157,928 A * | 12/2000 | Sprenger et al. | ............... | 1/1 |
| 6,363,081 B1 * | 3/2002 | Gase | ............... | 370/466 |
| 6,571,303 B1 * | 5/2003 | Yasue et al. | ............... | 710/52 |
| 6,711,623 B1 * | 3/2004 | Furukawa et al. | ............... | 709/249 |
| 6,742,022 B1 * | 5/2004 | King et al. | ............... | 709/219 |
| 6,809,830 B1 * | 10/2004 | Lafky | ............... | 358/1.13 |
| 6,920,545 B2 * | 7/2005 | Farwell et al. | ............... | 712/15 |
| 6,971,028 B1 * | 11/2005 | Lyle et al. | ............... | 726/25 |
| 7,489,677 B2 * | 2/2009 | Yoshihara et al. | ............... | 370/352 |
| 2001/0023441 A1 * | 9/2001 | Nishio et al. | ............... | 709/226 |
| 2001/0032270 A1 * | 10/2001 | Koo | ............... | 709/237 |
| 2001/0054157 A1 * | 12/2001 | Fukumoto | ............... | 713/201 |
| 2002/0016874 A1 * | 2/2002 | Watanuki et al. | ............... | 710/51 |
| 2002/0091822 A1 | 7/2002 | Tsuchitoi | ............... | 709/224 |
| 2002/0105931 A1 * | 8/2002 | Heinonen et al. | ............... | 370/338 |
| 2002/0111996 A1 * | 8/2002 | Jones et al. | ............... | 709/203 |
| 2002/0172178 A1 * | 11/2002 | Suzuki et al. | ............... | 370/338 |
| 2003/0093509 A1 * | 5/2003 | Li et al. | ............... | 709/223 |
| 2003/0101255 A1 * | 5/2003 | Green | ............... | 709/223 |
| 2003/0103226 A1 * | 6/2003 | Nishio | ............... | 358/1.13 |
| 2003/0140119 A1 * | 7/2003 | Acharya et al. | ............... | 709/219 |
| 2003/0169728 A1 * | 9/2003 | Choi | ............... | 370/352 |
| 2003/0187978 A1 * | 10/2003 | Nakamura et al. | ............... | 709/224 |

(Continued)

FOREIGN PATENT DOCUMENTS

JP     2001-345992 A     12/2001

(Continued)

*Primary Examiner*—Charles Rones
*Assistant Examiner*—Phuong-Thao Cao
(74) *Attorney, Agent, or Firm*—Rossi, Kimms & McDowell LLP

(57) ABSTRACT

A processing apparatus that is capable of dynamically updating a database when a processing device set for use is newly added, thus providing a process performed by the newly added processing device. In the processing apparatus, among a plurality of processing devices, a processing device that is not in use is set for use, and a registration request is issued for registering process designating information corresponding to the processing device set for use. Based upon the issued registration request, the process designating information corresponding to the processing device set for use is registered in the database.

12 Claims, 15 Drawing Sheets

U.S. PATENT DOCUMENTS

| | | | |
|---|---|---|---|
| 2004/0054779 A1* | 3/2004 | Takeshima et al. | 709/225 |
| 2004/0054810 A1* | 3/2004 | Furukawa et al. | 709/249 |
| 2004/0080770 A1* | 4/2004 | Hirose et al. | 358/1.13 |
| 2004/0128345 A1* | 7/2004 | Robinson et al. | 709/203 |
| 2004/0139228 A1* | 7/2004 | Takeda et al. | 709/245 |
| 2004/0221026 A1* | 11/2004 | Dorland | 709/223 |
| 2005/0105543 A1* | 5/2005 | Ikenaga et al. | 370/428 |
| 2006/0212270 A1* | 9/2006 | Shiu et al. | 702/188 |
| 2007/0106761 A1* | 5/2007 | Beoughter et al. | 709/219 |

FOREIGN PATENT DOCUMENTS

| | | |
|---|---|---|
| JP | 2002-189639 A | 7/2002 |
| JP | 2002-196995 A | 7/2002 |

* cited by examiner

FIG. 5

```
<env:Envelope xmlns:env="http://www.w3.org/2001/12/soap-envelope"
env:encodingStyle=":http://www.w3.org/2001/12/soap-encoding"
xmlns:enc="http://www.w3.org/2001/12/soap-encoding">
  <env:Body>
    <bm:create_job.xmlns:bm="urn:schemas-bmlinks-jp:service:bmlinks-1-2">
      <requesting-user-name>user1</requesting-user-name>
      <job-instruction>
      <job-instruction-params>
         <job-name>sample-job</job-name>
         <optional-attributes-fidelity>false/optional-attributes-fidelity>
         <copies>1</copies>
         <sides>two-sided-long-edge</sides>
         <finishings enc:array Type="bm:Finishing[1]">
            <finishing>staple</finishing>
         </finishings>
         <document-format>image/tiff</document-format>
      </job-instruction-params>
      <notification-instruction>
        <notification-recipient>http://192.168.1.5/event</notification-recipient>
        <events enc:arrayType="bm:Event[2]">
           <event>job-completed</event>
           <event>job-completed</event>
        </events>
      </notification-instruction>
    </job-instruction>
   </bm:create_job>
  </nv:Body>
</env:Envelope>
```

FIG. 6

```
<env:Envelope xmlns:env="http://www.w3.org/2001/12/soap-
envelope"env:encodingStyle="http://www.w3.org/2001/12/soap-encoding"
xmlins:enc="http//www.w3.org/2001/12/soap-encording">
    <env:Body>
      <bm:create_jobResponse xmlns bm="urn:schemas-bmlimks-
jp:service:bmlinks-1-2">
        <result-code>ok</result-code>
        <job-id>1</job-id>
        <notification-subscription-id>1</notification-subscription-id>
        <data-sink-uri>
            http://192.168.1.4/job001
        </data-sink-uri>
      </bm:cerate-jobResponse>
    </env:Body>
</env:Envelope>
```

POST/job001 HTTP/1.1
Host: Cannon-Printer
Content-Length: nnn (...data...)

FIG. 9

HTTP/1.1 200 OK
Connection: close

FIG. 10

```
<env: Envelope xmlns:env="http://www.w3.org/2001/12/soap-envelope" env:encodingStyle="http://www.w3.org/2001/12/soap-encoding" xmlns:enc="http://www.w3.org/2001/12/soap-encoding">
  <env: Body>
    <env: Fault>
      <faultcode>env: Sender</faultcode>
      <faultstring>Sender Error</faultstring>
      <detail>
        <bm:fault-information xmlns:bm="urn:schemas-bmlinks-jp:service:bmlinks-1-2">
          <result-code>conflicting-attributes</result-code>
        </bm:fault-information>
      </detail>
    </env: Fault>
  </env: Body>
</env: Envelope>
```

FIG. 12

| URL | port | PROCESSING MODULE |
|---|---|---|
| /top | 80 | RUI |
| /top/main | 80 | RUI |
| /info | 80 | RUI |
| EOF | NULL | NULL |

| URL | port | PROCESSING MODULE |
|---|---|---|
| /top | 80 | RUI |
| /top/main | 80 | RUI |
| /info | 80 | RUI |
| /ipp/print | 631 | IPP |
| EOF | NULL | NULL |

1301   1302   1303

| URL | port | PROCESSING MODULE |
|---|---|---|
| /top | 80 | RUI |
| /top/main | 80 | RUI |
| /info | 80 | RUI |
| /ipp/print | 631 | IPP |
| /soap/print | 80 | SOAP |
| EOF | NULL | NULL |

1401　1402　1403

PROCESSING APPARATUS, DATA PROCESSING METHOD, PROGRAM FOR IMPLEMENTING THE METHOD, AND STORAGE MEDIUM

BACKGROUND OF THE INVENTION

1. Field of the Invention

The present invention relates to a processing apparatus, a processing method, a program for implementing the method, and a storage medium storing the program, and more particularly to a processing apparatus and a processing method for processing data received according to a predetermined protocol such as HTTP (Hypertext Transfer Protocol), a program for implementing the method, and a storage medium storing the program.

2. Description of the Related Art

In recent years, local area networks (LANs) in which computers are interconnected have been widespread. Such LANs can be built in a floor, a building, a district and a still larger area, and they can be interconnected and can even be connected to a global-scale network. Each of the interconnected LANs involve a variety of hardware interconnection technologies and network protocols.

Under such LAN environment, not only personal computers (PCs) but also devices or apparatuses (hereinafter referred to as "apparatuses") such as multi-function apparatuses and printers are compatible to LANs so that they are shared among users within a LAN. These LAN-compatible apparatuses and PCs communicate with one another based on TCP/IP. For example, when these apparatuses print data from a PC or acquire apparatus information from a PC, they communicate with the PC using a printing protocol or a apparatus information acquisition protocol over TCP/IP. This realizes print services and apparatus information acquisition services. Generally, LPD (Line Printer Demon Protocol) is often used as a printing protocol, and SNMP (Simple Network Management Protocol) as a apparatus information acquisition protocol.

Among such protocols using TCP/IP is HTTP (Hypertext Transfer Protocol), which is mainly used by PCs to access the World Wide Web (WWW) to browse web pages on the WWW. Various HTTP-based services are now under way, some of which are print services using HTTP, Web browsing services using SOAP/XML (Simple Object Access Protocol/Extensible Markup Language) communication over HTTP, and interconnecting services supporting access to an Internet server via a proxy server from client PCs in an intranet.

Apparatuses within a LAN environment provide various services to client PCs by utilizing the HTTP server function. In recent years, some services recently provided by the apparatuses include apparatuses information acquisition services transferring apparatuses information on the apparatuses to client PCs via HTTP such that the PCs can acquire the apparatus information through their web browsers, and print services with IPP (Internet Printing Protocol) as a printing protocol using HTTP.

Thus, the HTTP server function available on the apparatus is designed to interpret a URL (Uniform Resource Locator) transferred by HTTP, perform a process corresponding to the URL, and return a response, as disclosed e.g. in Japanese Laid-Open Patent Publication (Kokai) No. 2002-196995. To acquire apparatus information, a URL "http://172.24.176.100/info" is used, for example, and to perform the IPP Printing function, a URL "http://172.24.176.100/ipp-print" is used, for example. That is, the HTTP server function is performed to acquire apparatus information and return a response when the URL is a apparatus information acquisition address. Further, the HTTP server function is performed to print based on IPP and return a response when the URL is for performing an IPP Print service address function.

Thus, in order to implement a variety of applications and services using the HTTP protocol, the HTTP server function available on apparatuses needs to interpret a variety of URLs. To meet this need, the HTTP server function has a database containing URLs and corresponding processes, and perform a process corresponding to any URL specified, by referring to the database.

However, the HTTP server function in the prior art uses a static database which must be updated by e.g. reconstructing the database whenever a new protocol or service using HTTP is added to the LAN environment. Moreover, to enable the updated database, the HTTP server function must be re-built, or the apparatus must be restarted. Thus, when a new HTTP-based protocol or service is added to the LAN environment, these operations consume much time and labor and hence the new HTTP-based protocol and services cannot be provided instantly.

SUMMARY OF THE INVENTION

It is an object of the invention to provide a processing apparatus and a data processing method, which are capable of dynamically updating a database when a processing device set for use is newly added, thus providing a process performed by the newly added processing device, as well as a program for implementing the data processing method and a storage medium storing the program.

To attain the above object, in a first aspect of the present invention, there is provided a processing apparatus comprising a communication device that communicates data with at least one apparatus on a network according to a predetermined protocol, a plurality of processing devices that perform respective different processes on data received from the apparatus using the predetermined protocol, a database that holds process designating information for designating processes in association with the processing devices corresponding to the process designating information, a specifying device that refers to the database to specify one of the processing devices that corresponds to the process designating information of the data received from the apparatus as a processing device that processes the data received from the apparatus, and a registering device that registers the process designating information corresponding to one of the processing devices that is set for use, based on a registration request issued for registering the process designating information corresponding to the one of the processing devices that is set for use.

With the arrangement of the processing apparatus according to the first aspect, the registration request for registering the process identifying information corresponding to the processing device set for use is issued, and the process identifying information corresponding to the processing device set for use is registered in the database based on the issued registration request, whereby the processing apparatus can dynamically update a database when a processing device set for use is newly added, and thus can provide a process by the newly added processing device.

Preferably, the predetermined protocol is HTTP and the process designating information held in the database is a URL or a URI.

More preferably, the database holds the URL or the URI, a port number for receiving data including the URL or the URI, and a name of one of the processing devices that corresponds to the URL or the URI, and the registering device registers a URL or a URI, and a port number which correspond to the one of the processing devices that is set for use, and a name of the one of the processing devices, in the database.

Still more preferably, the communication device has set therein a port having the port number as a port for transmitting or receiving data including a corresponding URL or URI, and when the port number corresponding to the one of the processing devices that is set for use is registered in the database, the port having the registered port number is set in the communication device.

Preferably, the registration request is issued when the one of the processing devices that is for use is activated.

More preferably, the one of the processing devices that is set for use issues the registration request.

Preferably, the processing apparatus further comprises a disabling device that sets at least one of the processing devices that is in use to be disabled, a deletion request issuing device that issues a deletion request for deleting the process designating information corresponding to the at least one of the processing devices set to be disabled, and a deleting device responsive to the issued deletion request, for deleting the process designating information corresponding to the at least one of the processing devices set to be disabled, from the database.

To attain the above object, in a second aspect of the present invention, there is provided a processing apparatus having a plurality of processing modules that perform respective different processes on data received using a predetermined protocol, comprising a communication device that communicates data with at least one apparatus on a network according to the predetermined protocol, a database that holds process identifying information for identifying processes in association with the processing modules corresponding to the process identifying information, a specifying device that refers to the database to specify one of the processing modules that corresponds to the process identifying information of the data received from the apparatus as a processing module that processes the data received from the apparatus, and a registering device that registers the process identifying information corresponding to one of the processing modules, based on a registration request for registering the process identifying information corresponding to the one of the processing modules.

To attain the above object, in a third aspect of the present invention, there is provided a method of processing data for a processing apparatus including a communication device that communicates data with at least one apparatus on a network according to a predetermined protocol, a plurality of processing devices that perform respective different processes on data received from the apparatus using the predetermined protocol, a database that holds process designating information for designating processes in association with the processing devices corresponding to the process designating information, the method comprising a specifying step of referring to the database to specify one of the processing devices that corresponds to the process designating information of the data received from the apparatus as a processing device that processes the data received from the apparatus, a processing step of causing the specified one of the processing devices to process the data received from the apparatus, and a registering step of registering the process designating information corresponding to one of the processing devices that is set for use, based on a registration request issued for registering the process designating information corresponding to the one of the processing devices that is set for use.

To attain the above object, in a fourth aspect of the present invention, there is provides a computer-executable program comprising a communication module for communicating data with at least one apparatus on a network according to a predetermined protocol, a plurality of processing modules for performing respective different processes on data received from the apparatus using the predetermined protocol, and a registering module for registering the process designating information corresponding to one of the processing modules that is set for use, based on a registration request issued for registering the process designating information corresponding to the one of the processing modules that is set for use.

To attain the above object, in a fifth aspect of the present invention, there is provides a storage medium storing the program such that the program is readable by a computer.

The above and other objects, features and advantages of the invention will become more apparent from the detailed description taken in conjunction with the accompanying drawings.

BRIEF DESCRIPTION OF THE DRAWINGS

FIG. 5 is a diagram showing an example of packet data called a "Create Job" transmitted to the multi-function apparatus 101 from the PC via a protocol used for a SOAP Print Service function;

FIG. 6 is a diagram showing an example of response packet data corresponding to the Create Job packet of FIG. 5;

FIG. 8 is a diagram showing an example of a print data transfer packet transmitted from the PC 103 by the POST method of HTTP;

FIG. 9 is a diagram showing an example of an HTTP response packet returned to the PC 103 in a step S708 appearing in FIG. 7;

FIG. 10 is a diagram showing an example of error response data generated in a step S704 appearing in FIG. 7;

FIG. 12 is a diagram showing an example of a URL table 1101 appearing in FIG. 11;

FIG. 13 shows another example of the URL table 1101;

DETAILED DESCRIPTION OF THE PREFERRED EMBODIMENTS

Figure 1:
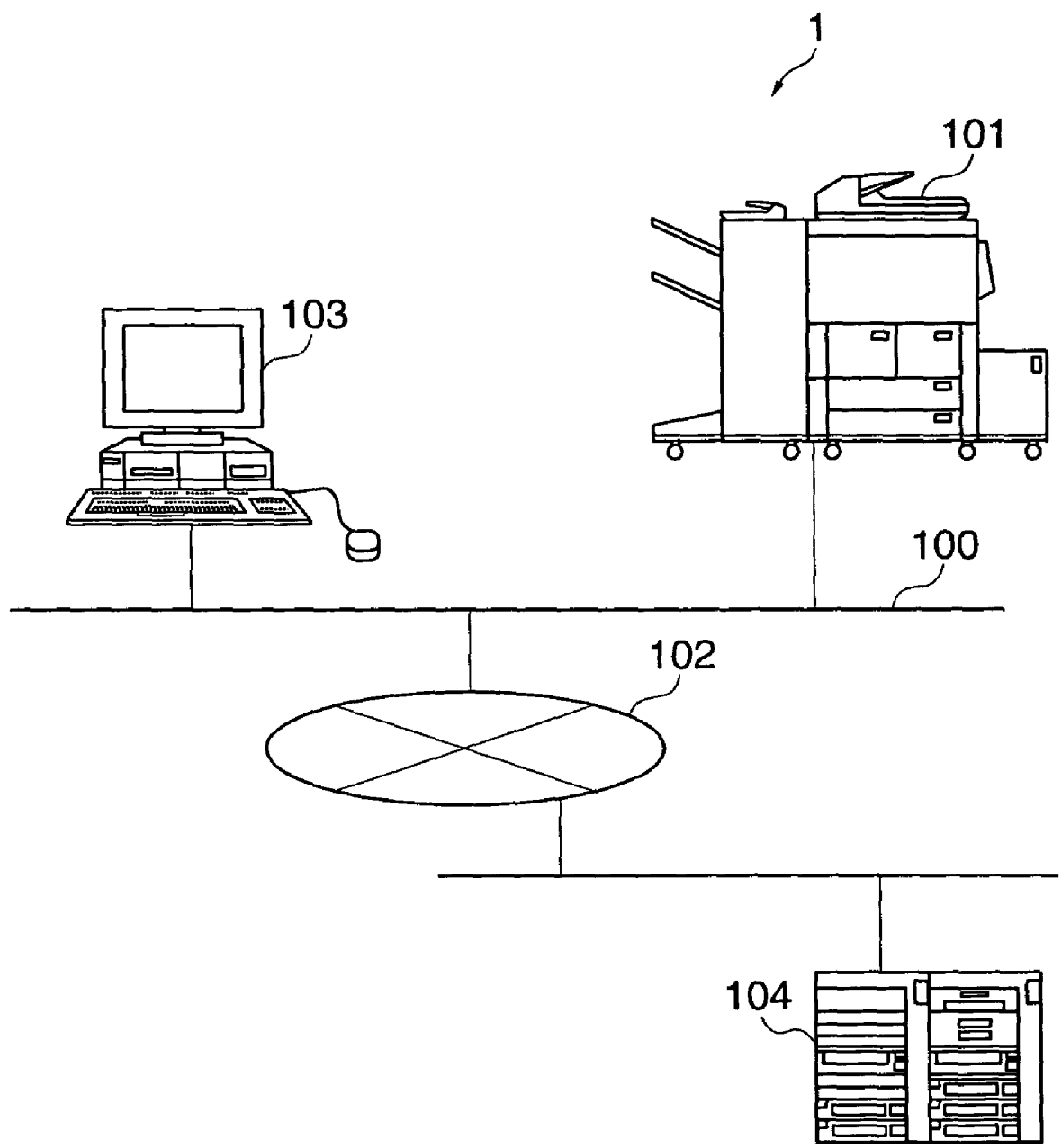
FIG. 1 is a schematic diagram showing the configuration of a network system including a processing apparatus according to an embodiment of the present invention.

The present invention will now be described in detail below with reference to the drawings showing preferred embodiments thereof. FIG. 1 is a schematic diagram showing the configuration of a network system including a processing apparatus according to an embodiment of the present invention. In the following description, a multi-function apparatus is applied as an example of the processing apparatus.

As shown in FIG. 1, in a network system 1, a multi-function apparatus 101 and a host computer (hereinafter called "the PC") 103 are connected to a LAN 100, which is connected to a WAN (Wide Area Network) 102. A network storage server (hereinafter called "the server") 104 is connected to the WAN 102.

The multi-function apparatus 101 has a function for providing network print services, network scan services, and like services for the LAN 101. Here, the print services provided by the multi-function apparatus 101 utilize HTTP.

Figure 2:
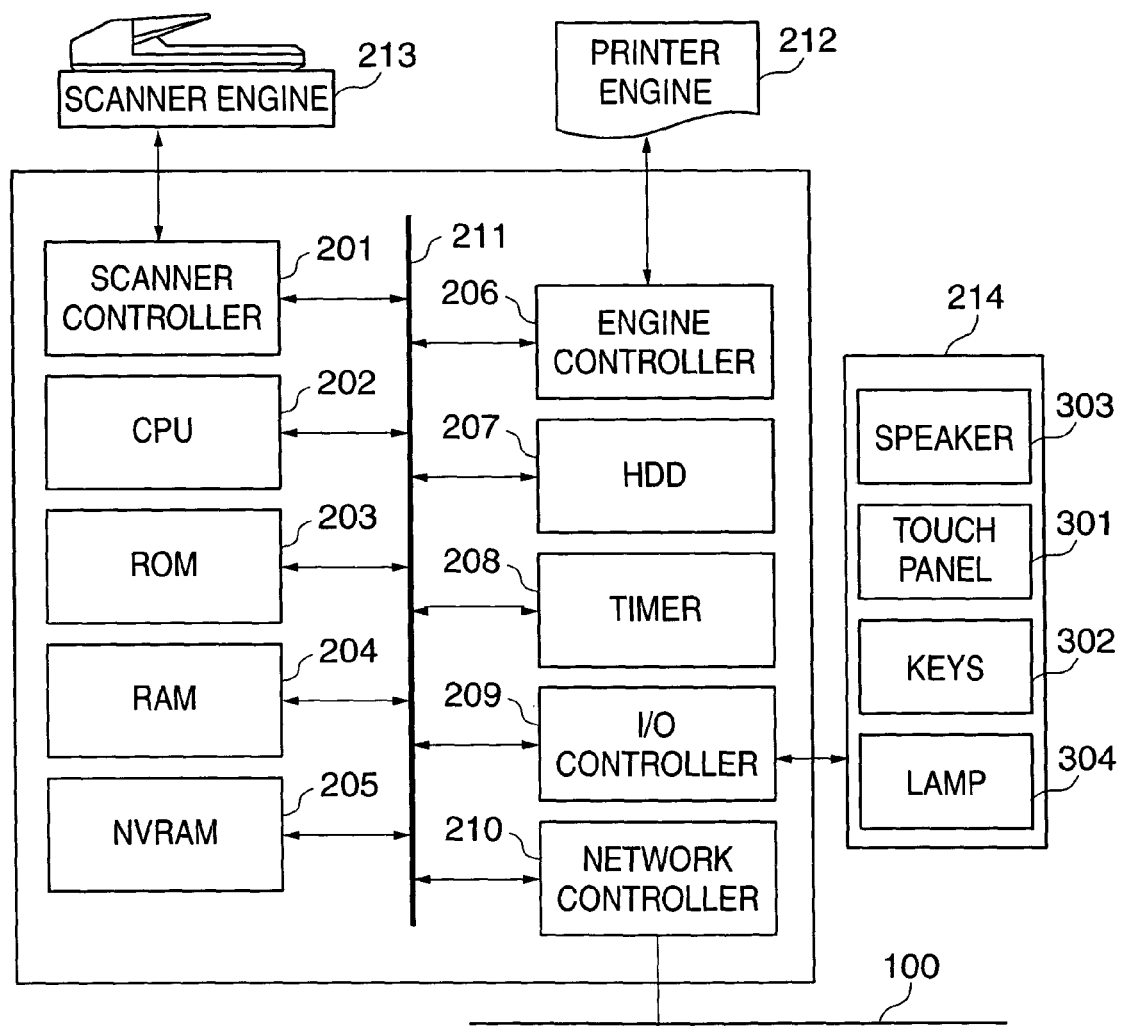
FIG. 2 is a block diagram showing the configuration of a multi-function apparatus 101 appearing in FIG. 1.
Figure 3:
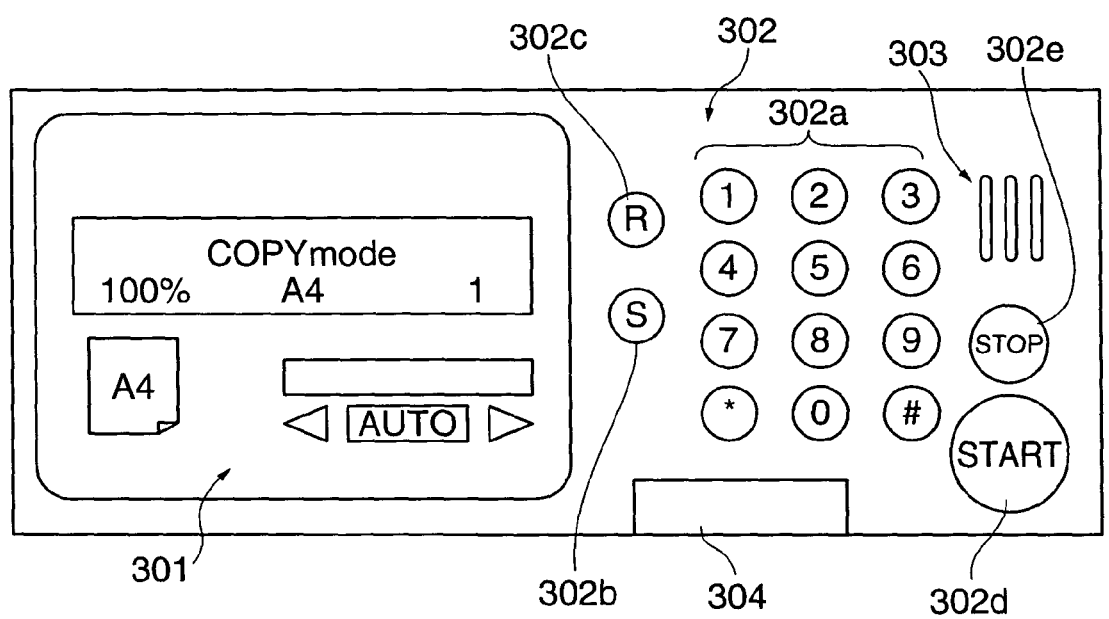
FIG. 3 is a schematic plan view showing the layout of a touch panel 301, keys 302, etc. in an operating section 214 appearing in FIG. 2.

Referring next to FIGS. 2 and 3, the configuration of the multi-function apparatus 101 in FIG. 1 will be described.

FIG. 2 is a block diagram showing the configuration of a multi-function apparatus, and FIG. 3 is a schematic view showing the layout of a touch panel, keys, etc. in an operating section 204 appearing in FIG. 2.

As shown in FIG. 2, the multi-function apparatus 101 has a CPU 202 that controls the entire apparatus according to programs stored in a ROM 203 or a hard disk drive (HDD) 207, and performs various processing.

Connected to the CPU 202 via an internal bus 211 are the ROM 203 and the HDD 207, as well as a RAM 204 that provides a work area for the CPU 202, an NVRAM 205 that holds values set via the operating section 214, a scanner controller 201 that controls the operation of a scanner engine 213, an engine controller 206 that controls the operation of a printer engine 212, a timer 208, a panel I/O controller 209 that controls input/output of data with respect to the operating section 214, and a network controller 210 that controls input/output of data with respect to the LAN 100.

As shown in FIGS. 2 and 3, the operating section 214 is provided with a touch panel 301, a group of keys 302, a speaker 303, and a lamp 304. As shown in FIG. 3, the touch panel 301 displays screens for setting various parameters, and soft keys. The screen shown in FIG. 3 is an example of a standby screen. The group of keys 302 includes a plurality of hard keys, which are ten keys 302*a*, a service key 203*b*, a setting key 302*c*, a start key 302*d*, and a stop key 302*e*. The ten keys 302*a* are used to input numerical values. When the service key 302*b* is pressed, various service screens are displayed on the touch panel 301, enabling a user to select and set various services including copying. When the setting key 302*c* is pressed, various screens for setting parameters are displayed on the touch panel 301. The speaker 303 outputs an alarm, etc. to the user. The lamp 304 is controlled so as to blink in the event of a jam during printing or copying.

Figure 4:
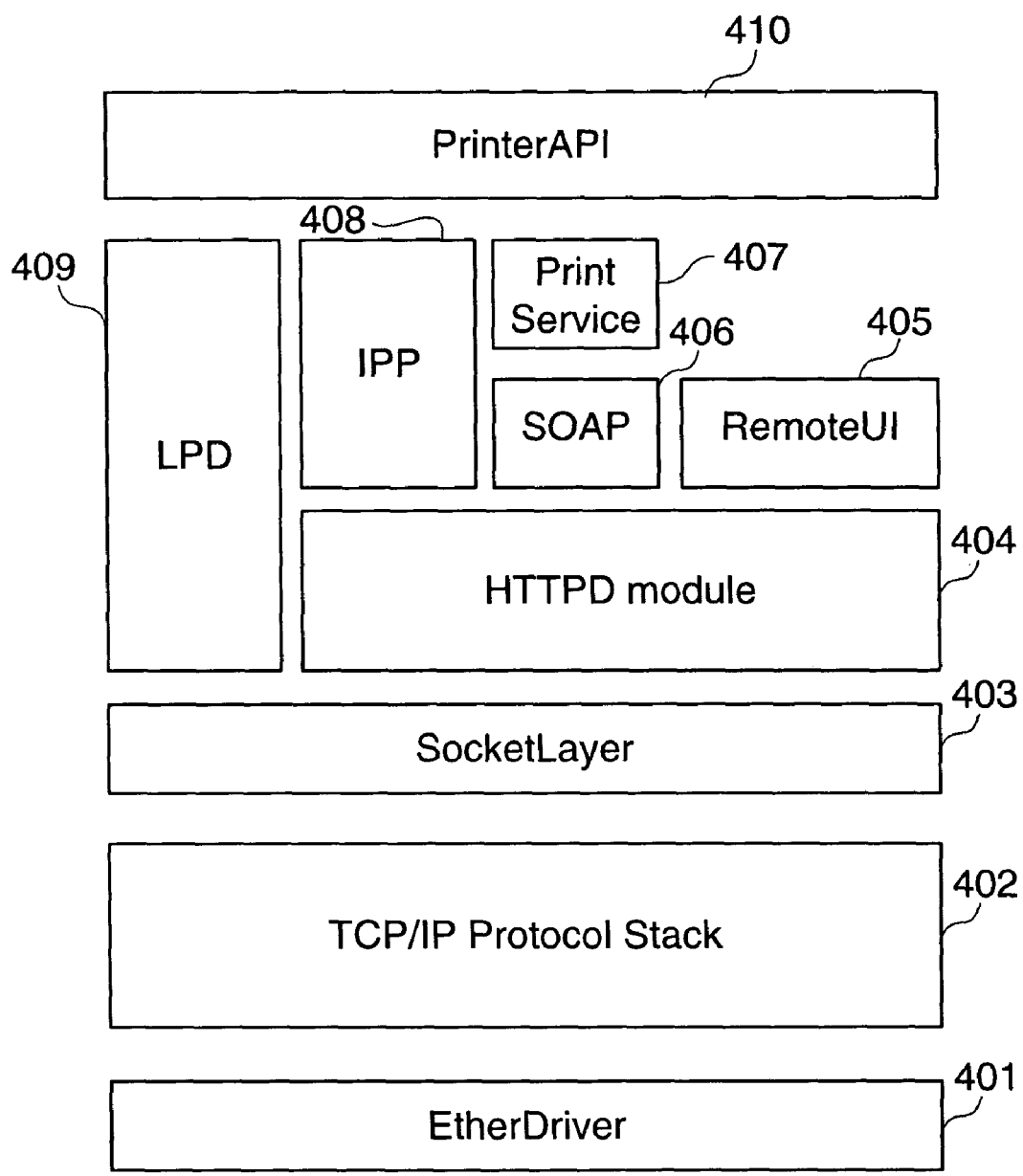
FIG. 4 is a block diagram showing a module configuration for implementing the HTTP server function by which the multi-function apparatus 101 provides various service for a PC 103.

Turning next to FIG. 4, a module configuration for realizing the HTTP server function will be described, by which the multi-function apparatus 101 provides various services for the PC 103.

FIG. 4 is a block diagram showing a module configuration for realizing the HTTP server function by which the multi-function apparatus 101 provides various services for the PC 103.

The module configuration shown in FIG. 4 is implemented when the CPU 202 executes a program stored in the ROM 203 or the HDD 207.

As shown in FIG. 4, this module configuration is comprised of an Ether Driver 401, a TCP/IP protocol stack 402, a Socket Layer 403, an HTTPD module 404, a Remote UI module 405, a SOAP module 406, a Print Service module 407, an IPP module 408, an LPD module 409, and a Printer API 410.

The Ether Driver 401 transmits and receives Ethernet (registered trademark) packets by connection to the LAN 100. The TCP/IP protocol stack 402 supports TCP/IP. The multi-function apparatus 101 according to the present embodiment supports multiple protocols, and can perform communications using protocols other than TCP/IP, such as Net Ware and AppleTalk (In FIG. 4, the modules supporting these protocols are omitted). The Socket Layer 403 defines an API (Application Program Interface) for TCP/IP. All programs for performing communications using TCP/IP use the API provided by the Socket Layer 403 for communication. The HTTPD module 404 is used to build the HTTP server function. This module identifies URLs (or URIs (Uniform Resource Identifiers)) and performs processing corresponding to the URLs identified. The Remote UI module 405 refers to apparatuses using HTTP. The SOAP module 406 implements a distributed object environment by RPC among apparatuses. The Print Service module 407 provides print services using SOAP/XML to implement the SOAP Print Service function within an HTTP-based LAN environment in cooperation with the SOAP module 406. The IPP module 408 implements a print function using IPP. Here, IPP is a printing protocol over HTTP.

Thus, in the present embodiment, the IPP Printing function, the Remote UI function, and the SOAP Print Service function are provided, and these functions are supported by the HTTPD module 404. Details of the HTTPD module 404 will be described later.

The LPD module 409 realizes a printing function using the LPD protocol. The Printer API 410 transfers print data received by various printing modules (each of the LPD, IPP, SOAP print services). Within the apparatus 101, data received from the Printer API 410 is handled, converted into bitmap data, and then sent to the printer engine 212 via the engine controller 206 for printing.

Next, a description will be given of the SOAP Print Service function according to the present embodiment, which is implemented over HTTP, with reference to FIGS. 5 and 6. FIG. 5 is a diagram showing an example of packet data called a "Create Job" transmitted to the multi-function apparatus 101 from the PC 103 via a protocol used for the SOAP Print Service function. FIG. 6 is a diagram showing an example of response packet data corresponding to the Create Job packet of FIG. 5.

As shown in FIG. 5, the packet data of the Create Job is described in an XML format. The Create Job packet data is a command by which the PC 103 instructs the multi-function apparatus 101 to start a job (printing), and includes information such as a requesting user name (<requesting-user-name> tag) and a job-related instruction (<job-instruction> tag). The <job-instruction> tag includes a <copies> tag for setting the number of copies for printing, a <sides> tag for setting double-sided printing, a <finishing> tag for setting the finish of printing, etc. The multi-function apparatus 101 performs a job based on the values set in these tags. Further, the <job-instruction> tag may optionally include a <notification instruction> tag. Job-related notification information is described in this tag. In the present embodiment, the job-related notification information includes a <notification-recipient> tag for setting the recipient of a notification, and an <event> tag for setting a notification condition. The multi-function apparatus 101 performs an event transmitting process based on the values set in these tags.

When having received the Create Job packet shown in FIG. 5, the multi-function apparatus 101 returns a response packet to the PC 103. As shown in FIG. 6, this response packet is described in the XML format, similarly to the Create Job packet. In the present embodiment, Create Job packets and their response packets are exchanged using SOAP over HTTP. The Create Job response packet includes information such as a result code (<result-code> tag) to a Create Job command, a generated job identifier (<job-id> tag), and a URI for a printing port (<data-sink-uri> tag). In FIG. 6, information 601 corresponds to a URI for a printing port, which is "http://192.168.1.4/job001".

Figure 7:
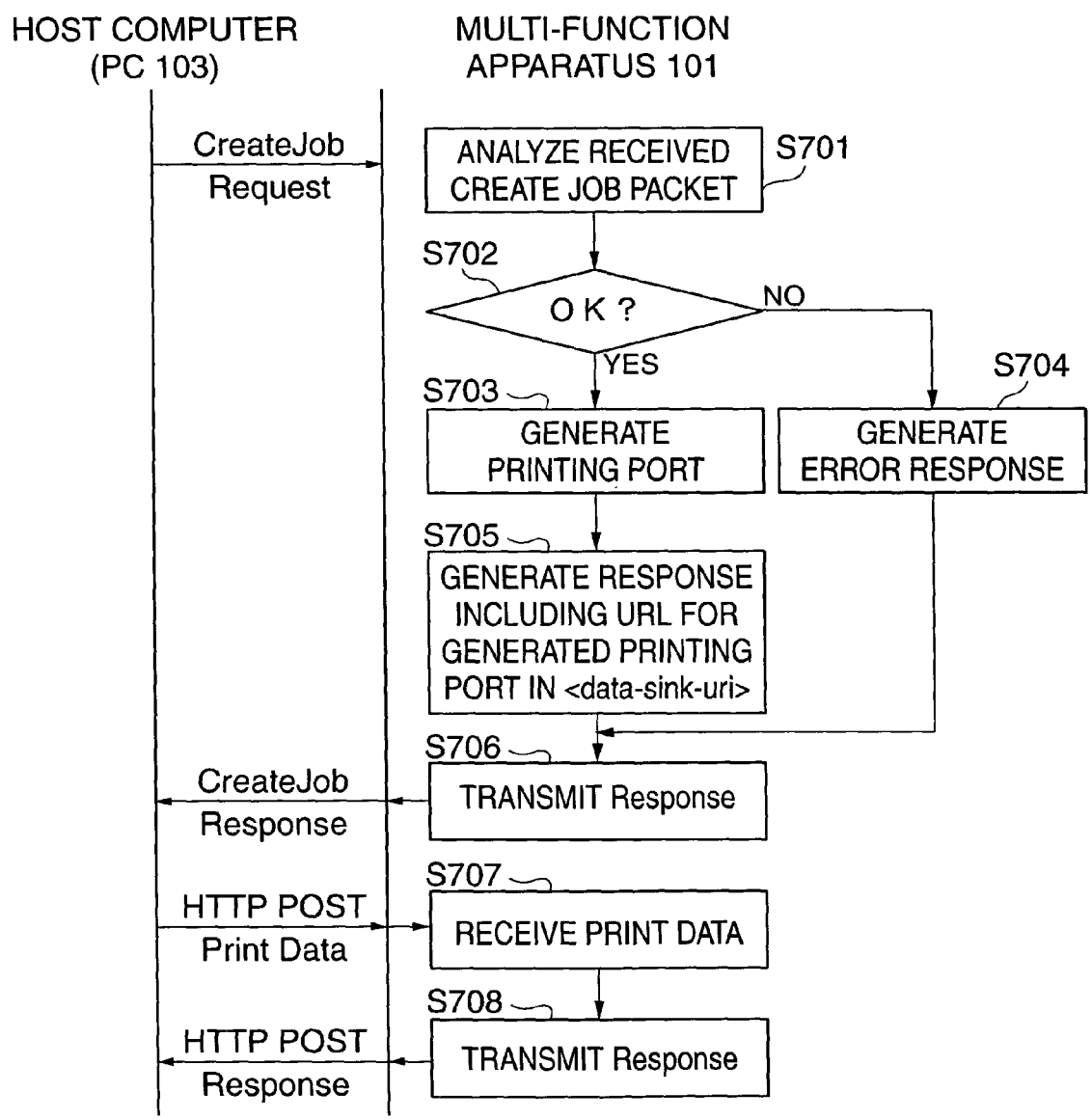
FIG. 7 is a flowchart showing the procedure of a printing process using the SOAP Print Service function executed by the multi-function apparatus 101.

Next, a description will be given of the operation of the multi-function apparatus 101 when the PC 103 prints using the SOAP Print Service function of the apparatus 101, with reference to FIGS. 7 to 10. FIG. 7 is a flowchart showing the procedure of a printing process using the SOAP Print Service function executed by the multi-function apparatus 101. FIG. 8 is a diagram showing an example of a print data transfer packet transmitted from the PC 103 by the POST method of HTTP. FIG. 9 is a diagram showing an example of an HTTP response packet returned to the PC in a step S708 appearing in FIG. 7. FIG. 10 is a diagram showing an example of error response data generated in a step S704 appearing in FIG. 7. The printing process of the flowchart shown in FIG. 7 is executed by the CPU 202 of the multi-function apparatus 101 according to a program stored in the ROM 203 or the HDD 207.

When carrying out printing using the SOAP Print Service function of the multi-function apparatus 101, the PC 103 transmits a Create Job packet such as shown e.g. in FIG. 5 to the apparatus 101.

Upon receiving the Create Job packet from the PC 103, the multi-function apparatus 101 analyzes XML data described in the Create Job packet received, in a step S701 in FIG. 7. Then, the apparatus 101 determines in a step S702 whether or not any error is found through the analysis. If no error is found, the apparatus 101 generates a printing port for receiving print data, in a step S703.

Next, in a step S705, the multi-function apparatus 101 generates XML data as a response to the Create Job packet. At this time, a URI of the generated port for receiving print data is set as the value of the <data-sink-uri> tag. For example, the URI 601 shown in FIG. 6 is embedded in the XML data. Then, in a step S706, the multi-function apparatus 100 transmits the XML data as a response to the Create Job packet, to the PC 103 using SOAP.

Thereafter, the PC 103 transmits the print data to the URI designated by the <data-sink-uri> tag using the POST method of HTTP. The print data is described as shown e.g. in FIG. 8.

Then, in a step S707, the multi-function apparatus 101 receives the print data from the PC 103 through the designated printing port, and causes the printer engine 212 to carry out printing while performing appropriate processing on the print data. When the reception of the print data has been normally completed, the multi-function apparatus 101 transmits an HTTP response packet as shown in FIG. 9 to the PC 103 in a step S708 and delete (close) the printing port, to thereby complete the printing.

On the other hand, if it is determined in the step S702 that an error is found in the XML data described in the Create Job, then, in the step S704, the multi-function apparatus 101 generates error response data such as shown e.g. in FIG. 10, and in the subsequent step S706, transmits the error response data to the PC 103. In response to the error data, the PC 103 terminates the process without transmitting the print data.

Figure 11:
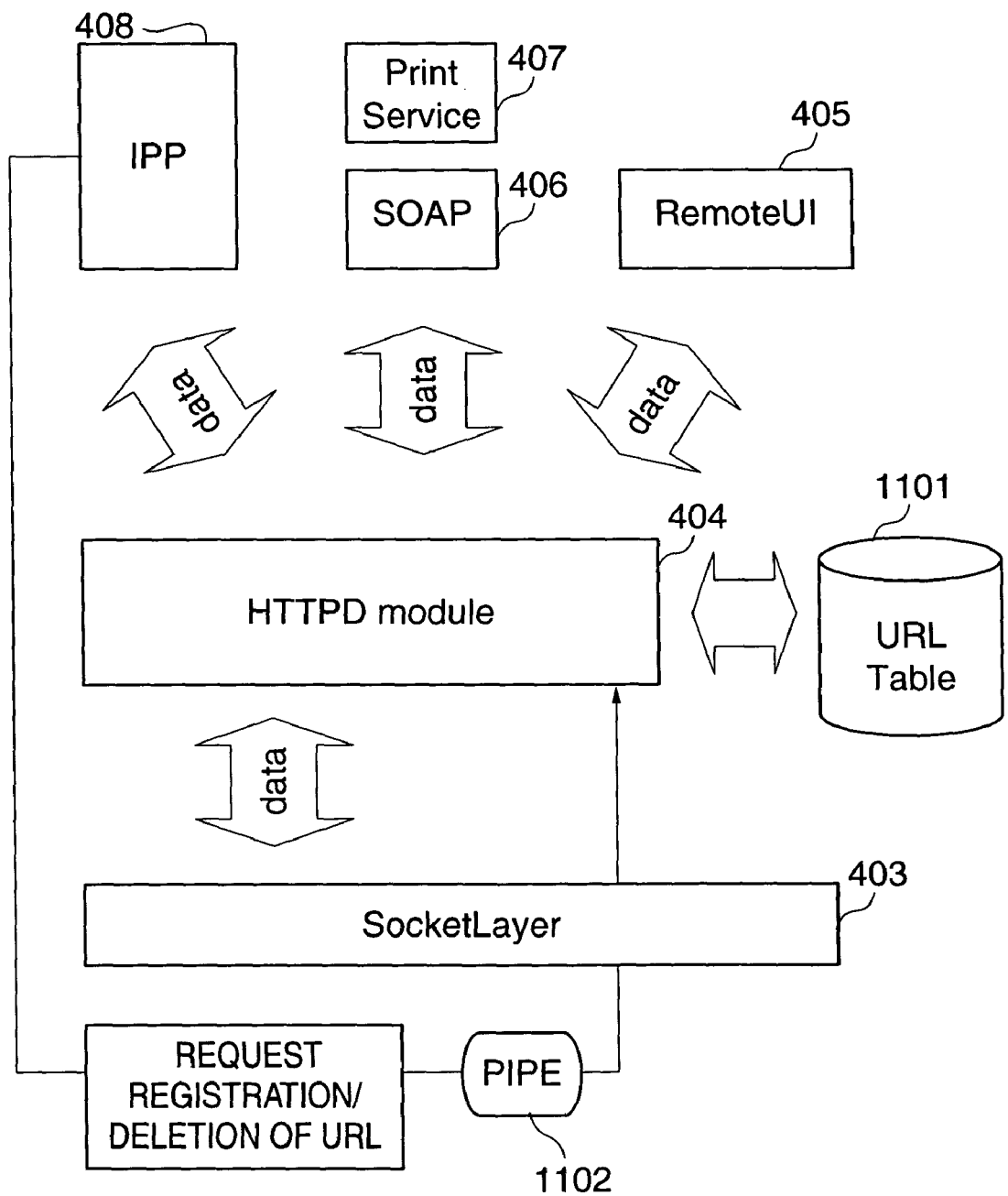
FIG. 11 is a schematic diagram showing a data flow and a control flow for an HTTPD module and its neighboring modules in FIG. 4.
Figures 14, 15:
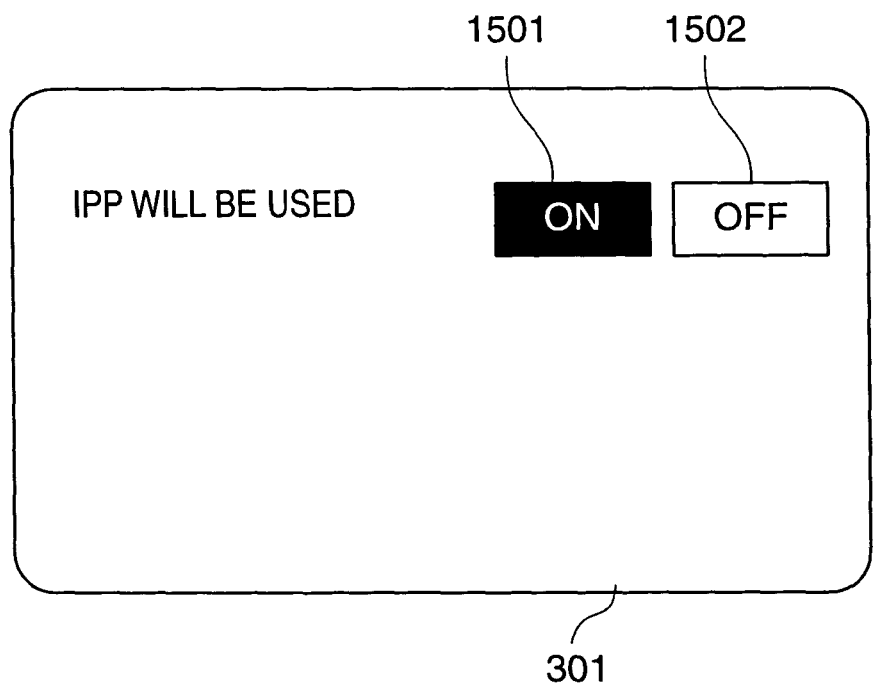
FIG. 14 shows still another example of the URL table 1101.
FIG. 15 is a view showing an example of a screen for setting an IPP Print function.

Referring next to FIGS. 11 to 14, details of the HTTPD module 404 will be described. FIG. 11 is a schematic diagram showing a data flow and a control flow for the HTTPD module and its neighboring modules in FIG. 4. FIG. 12 to FIG. 14 are diagrams showing examples of a URL table appearing in FIG. 11.

As shown in FIG. 11, the HTTPD module 404 manages URLs corresponding respectively to the IPP Printing function (the IPP module 408), the Remote UI function (Remote UI module 405), and the SOAP Print Service function (SOAP module 406), using the URL table 1101. The HTTPD module 404 interprets the header and body parts of an HTTP packet. Specifically, the HTTPD module 404 identifies a URL designated in the header part, searches through the URL table 1101 for a processing module (the Remote UI module 405, the SOAP module 406, or the IPP module 408) corresponding to the URL identified, and transfers data in the body part to the processing module searched. And the processing module performs processing and returns a response.

Further, in the present embodiment, each of the processing modules 405, 406, and 408 issues a URL registration/deletion request. This request is sent to the HTTPD module 404 via a communication path called a PIPE 1102 and the Socket Layer 403. Upon receiving the request, the HTTPD module 404 updates URL information in the URL table 1101 based on the received request. FIG. 11 shows the case where the IPP module 408 issues a URL registration/deletion request.

Here, as shown in FIG. 12, described in the URL table 1101 are URLs 1201, port numbers 1202 for receiving the respective URLs, and processing modules 1203 for the respective received URLs. In this exemplary table, if a URL is any of /top, /top/main, and /info and hence the port number 1202 is a port number 80, then a processing module corresponding to the URL is the Remote UI (RUI) module 405. That is, in the case of this table 1101, there are registered URLs to be processed by the Remote UI (RUI) module 405. Data for each URL is delivered to the Remote UI (RUI) module 405, and the module 405 then processes the data and returns the processing result to the PC 103. In the table 1101, a URL denoted as EOF indicates the end of the table.

Another example of the URL table 1101 is shown in FIG. 13, in which a URL "/ippprint" 1301 is added to the URL table of FIG. 12, with a number 631 registered as a port number 1302 and the IPP module 408 added as a processing module 1303. In this exemplary table, if a URL received at the port number 631 is "/ippprint", the body part of the HTTP packet received is delivered to the IPP module 408.

Further, in the case of a table shown in FIG. 14 as still another example of the URL table 1101, a URL 1401 "/soap/print" is added to the URL table of FIG. 13, with a number 80 registered as a port number 1402 and the SOAP module 406 added as a processing module 1403. In this example, if a URL received at the port number 80 is "/soap/print", the body part of the HTTP packet received is delivered to the SOAP module 406.

Figure 16:
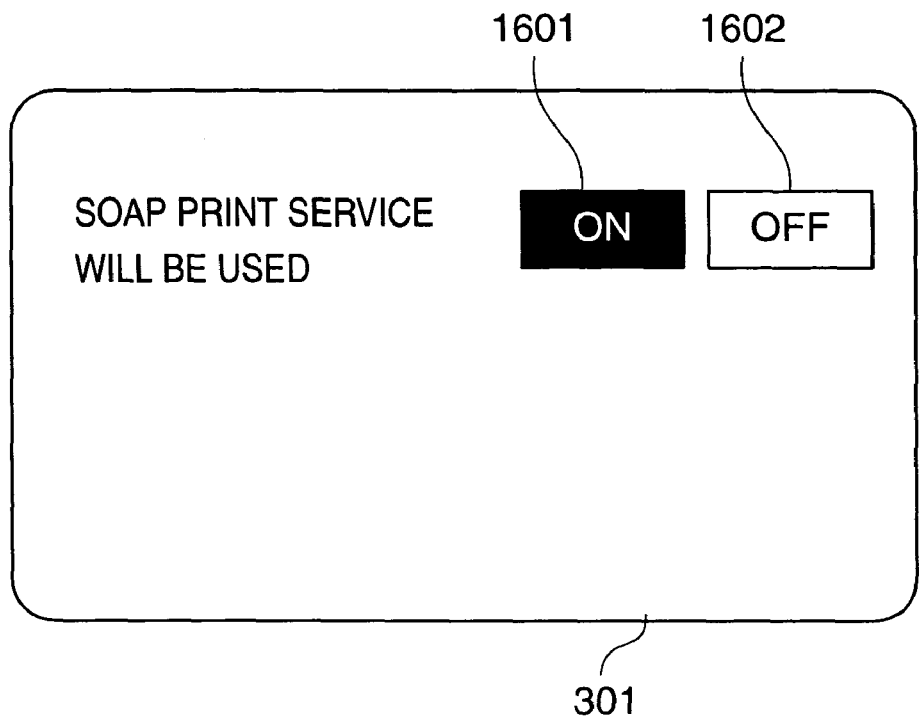
FIG. 16 is a view showing an example of a screen for setting the SOAP Print Service function.

Next, with reference to FIGS. 15 and 16, setting screens will be described, which are displayed on the touch panel 301 of the operating section 214. FIG. 15 is a view showing an example of a screen for setting the IPP Printing function. FIG. 16 is a view showing an example of a screen for setting the SOAP Print Service function.

When the setting key 302c on the operating section 214 is pressed, screens are displayed on the touch panel 301 to enable various services to be provided. FIG. 15 shows one of such screens, which is used to enable the IPP Printing function to be provided. In this screen, displayed are an ON button 1501 for enabling the IPP Printing function and an OFF button 1502 for disabling the IPP Printing function. Set values indicating what is set by selecting the ON button 1501 or the OFF button 1502 are saved in the NVRAM 205. The set values saved in the NVRAM 205 will not be lost even after the power is turned off.

If the user selects the ON button 1501 to enable the IPP Printing function, the IPP module 408 issues to the HTTPD module 404 a URL registration request indicating a URL which the module 408 will process, a port number, and its name as a processing module. On the other hand, if the IPP Printing function is disabled by selecting the OFF button 1502, the IPP module 408 issues to the HTTPD module 404 a URL deletion request indicating a URL for deletion. The URL registration request or the URL deletion request causes the HTTPD module 404 to add new information to or delete the corresponding information from the URL table 1101.

Another screen shown in FIG. 16 is available to enable the SOAP Print Service function to be provided. Displayed on this screen are an ON button 1601 for enabling the SOAP Print Service function and an OFF button 1601 for disabling the SOAP Print Service function. Set values indicating what is set by selecting the button 1601 or 1602 is saved in the NVRAM 205. Further, when the user selects the ON button 1601 to enable the SOAP Print Service function, the SOAP module 406 issues to the HTTPD module 404 a URL registration request indicating a URL which it will process, a port number, and its name as a processing module. If, on the other hand, the user disables the SOAP Print Service function by selecting the OFF button 1602, the SOAP module 406 issues to the HTTPD module 404 a URL deletion request indicating a URL for deletion. The HTTPD module 404 adds new information to or deletes the corresponding information from the URL table 1101 based on the URL registration request or the URL deletion request.

Note that a new processing module may be set for use on a screen as shown in FIG. 15 or FIG. 16 when such a module has been installed from an external apparatus.

Figure 17:
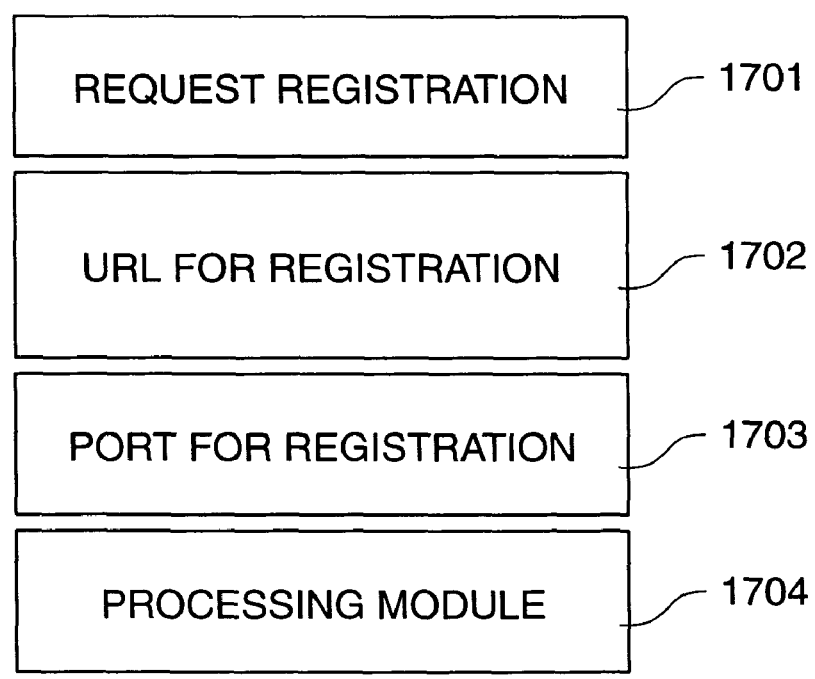
FIG. 17 is a schematic diagram showing the format of a URL registration request issued to the HTTPD module 404 by any of HTTP processing modules.
Figure 18:
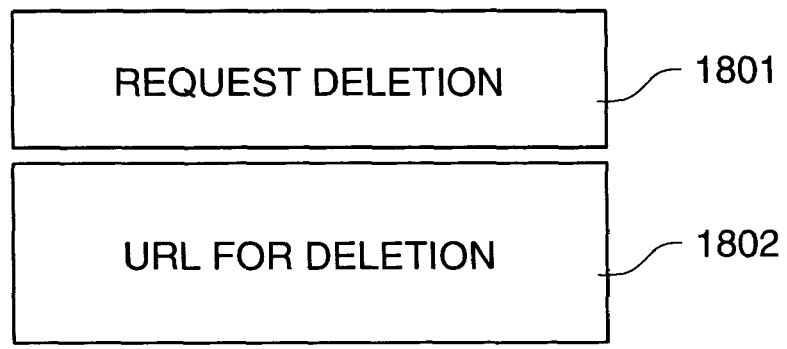
FIG. 18 is a schematic diagram showing the format of a URL deletion request issued to the HTTPD module by any of the HTTP processing modules.

Referring further to FIGS. 17 and 18, details of a URL registration request and a URL deletion request issued to the HTTPD module 404 by each one of the HTTP processing modules will be described. FIG. 17 is a schematic diagram showing the format of a URL registration request issued to the HTTPD module by any of the HTTP processing modules. FIG. 18 is a schematic diagram showing the format of a URL deletion request issued to the HTTPD module by any of the HTTP processing modules.

As shown in FIG. 17, a URL registration request issued by each of the HTTP processing modules to the HTTPD module 404 contains information such as a tag 1701 indicating a registration request, a URL 1702 for registration, a port 1703 for registration, and the name 1704 of a processing module for processing the URL for registration. Upon receiving the URL registration request, the HTTPD module 404 saves the URL 1702, the port 1703 for registration, and the processing module name 1704 which are contained in this request, in the respective entries 1201, 1202, and 1203 to update the URL table 1101.

As shown in FIG. 18, a URL deletion request issued to the HTTPD module 404 by each of the HTTP processing modules contains information such as a tag 1801 indicating a deletion request, and a URL 1802 for deletion. Upon receiving the URL deletion request, the HTTPD module 404 searches through the URL table 1101 to find an entry corresponding to the URL 1802 for deletion, and deletes the entry.

Figure 19:
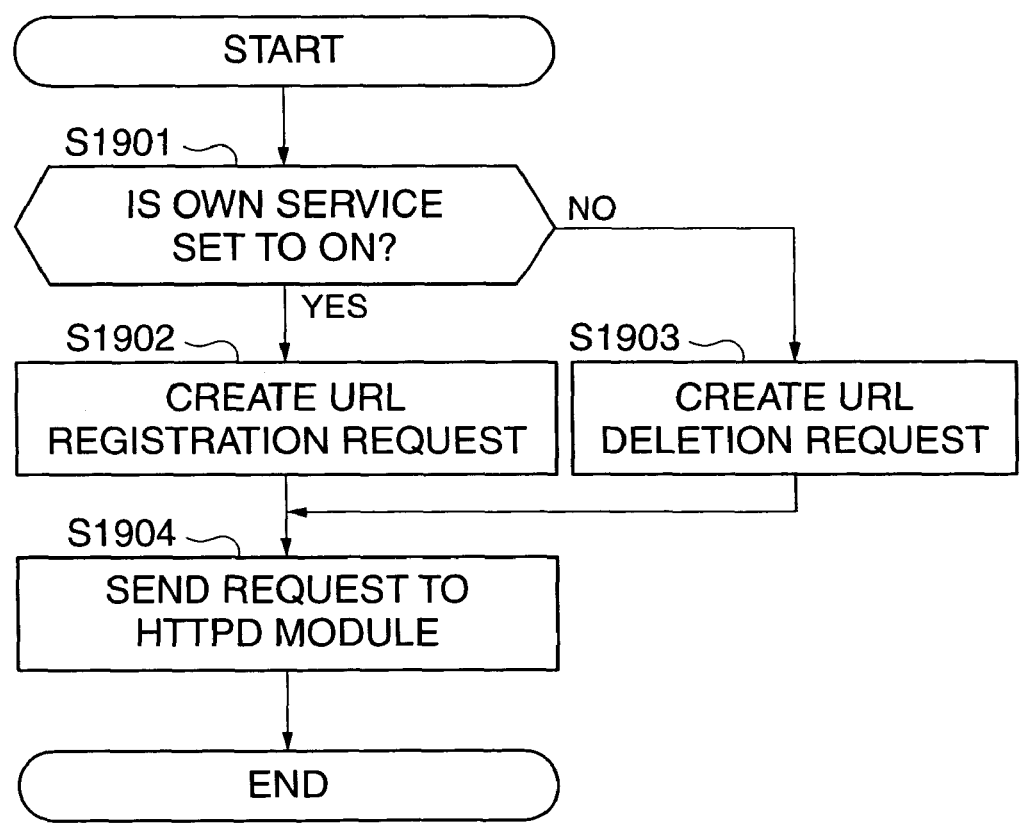
FIG. 19 is a flowchart showing the procedure of a process executed by each of the HTTP processing modules at the time of start thereof.

Referring next to FIG. 19, details of the HTTPD module 404 will further be described.

FIG. 19 is a flowchart showing the procedure of a process executed by each of the HTTP processing modules at the time of start thereof. In the flowchart, the procedure of a process executed by the IPP module 408 at the time of start thereof will be described.

As shown in FIG. 19, when the power is turned on, the IPP module 408 determines, in a step S1901, whether or not a service which it provides, i.e. the IPP Print service is enabled by referring to the set values in the NVRAM 205. If the IPP Print service is enabled, the module 408 creates, in a step S1902, a URL registration request as shown in FIG. 17, which contains e.g. a printing URL "/ippprint" as the URL 1702 for registration, a printing port number "631" as the port 1703 for registration, and a module "IPP" as the processing module 1703 since all requests arrived at the port number 631 are to be processed by the IPP module 408. In a step S1904, the IPP module 408 sends the URL registration request to the HTTPD module 404 via the PIPE 1102, and then terminates the process.

On the other hand, when it is determined in the step S1901 that the IPP Print service is not enabled, the IPP module 408 determines that the IPP Print service is disabled, and creates a URL deletion request as shown in FIG. 18, in a step S1903. Then, in a step S1904, the IPP module 408 sends this URL deletion request to the HTTPD module 404 via the PIPE 1102, and terminates the process, whereby the IPP module 408 can register or delete a URL which it processes in or from the URL table 1101 managed by the HTTPD module 404.

In the SOAP Print Service function as well, processing similar to the above is performed by the SOAP module 406, similarly to the IPP Print service, whereby the SOAP module 406 can register or delete a URL that it processes in or from the URL table 1101 managed by the HTTPD module 404.

Referring next to a flowchart shown in FIG. 20, a process executed by the HTTPD module 404 will be described.

Figure 20:
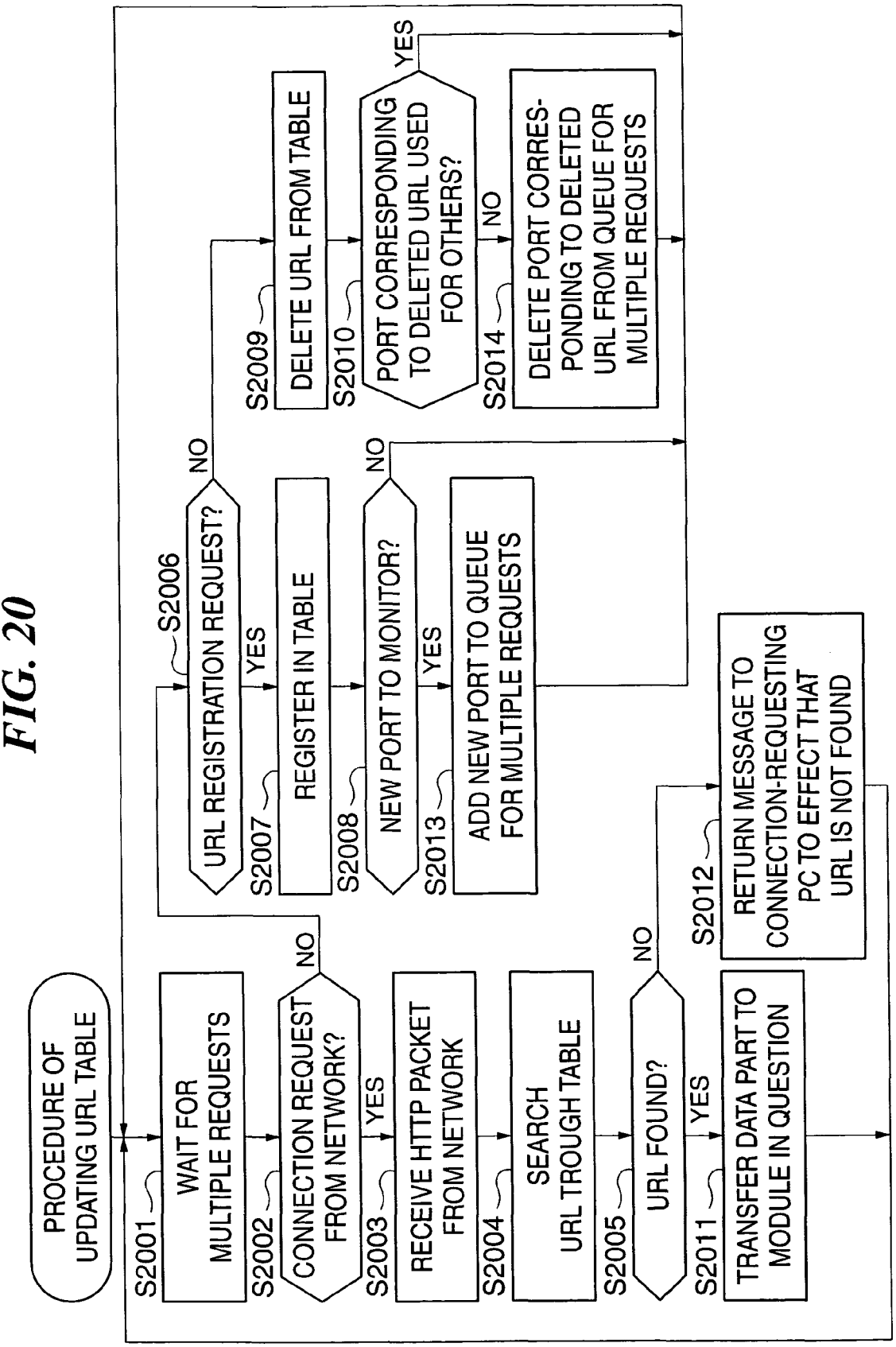
FIG. 20 is a flowchart showing the procedure of a process executed by the HTTPD module 404.

FIG. 20 is a flowchart showing the procedure of a process executed by the HTTPD module 404.

In a step S2001, the HTTPD module 404 waits for both a connection request sent via the LAN 100 and a processing request sent via the PIPE 1102. A receiving function of the Socket Layer 403 is generally used for this step of waiting for both requests. If a request occurs here, the HTTPD module 404 determines, in a step S2002, whether it is a connection request from the LAN 100 or not. If it is a connection request from the LAN 100, then, in a step S2003, the HTTPD module 404 receives the packet from the LAN 100 using the receiving function of the Socket Layer 403.

Then, in a step S2004, the HTTPD module 404 extracts a URL through analysis of the header part of the packet, and searches through the URL table 1101 to check if the URL is found in the table, and in a step S2005, it determines whether or not a URL that coincides with the extracted URL is found. If the URL that coincides with the extracted URL is found, the HTTPD module 404 transfers, in a step S2011, the body part (data part) of the HTTP packet to the processing module that processes the URL. For example, for a URL "/info", the data part of the HTTP packet is transferred to the Remote UI module 405.

If it is determined in the step S2005 that the URL in question is not found, the HTTPD module 404 returns a message to the connection-requesting PC 103 to the effect that the URL in question is not found, in a step S2012, and then returns to the step S2001.

If it is determined in the step S2002 that the request is not a connection request from the LAN 100, then, in a step S2006, the HTTPD module 404 determines whether or not the request is a URL registration request. If the request is a URL registration request, then, in a step S2007, the HTTPD module 404 registers, in the URL table 1101, a URL, a port number, and a processing module designated by the request. Then, in a step S2008, the HTTPD module 404 determines whether or not a port having the port number designated by the URL registration request is to be newly monitored. If the port having the designated port number is to be newly monitored, then, in a step S2013, the HTTPD module 404 adds the port (new port) having the designated port number to a queue of ports for multiple requests waited in the step S2001, and then the process returns to the step S2001. If, on the other hand, it is determined in the step S2008 that there is no port to be newly monitored, and the process returns to the step S2001.

If it is determined in the step S2006 that the request is not a URL registration request, i.e. it is a URL deletion request, then, in a step S2009, the HTTPD module 404 deletes a URL entry coinciding with the URL designated by the URL deletion request from the URL table 1101. And in a step S2010, the HTTPD module 404 determines whether or not the port having the port number corresponding to the URL deleted from the table 1101 is used for another service. If the port having the port number corresponding to the URL deleted from the URL table 1101 is used for another service, the process returns to the step S2001. On the other hand, if the port having the port number corresponding to the URL deleted from the URL table 1101 is not used for another service, then, in a step S2014, the HTTPD module 404 deletes, the port having the port number corresponding to the URL deleted from the URL table 1101, from the queue for multiple requests waited in the step 2001, followed by the process returning to the step S2001, since the HTTPD module 404 should no longer monitor reception of requests using the port having the port number corresponding to the URL deleted from the URL table 1101.

For example, in the case where the initial state of the URL table 1101 is such as shown in FIG. 12, when a URL "/ipp-print" is designated by a request from the LAN 100, this request is not acceptable since the designated URL is not described in the URL table 1101. Thus, in the multi-function apparatus, the IPP Printing function is enabled by the above-mentioned user operation. Thereafter, when the IPP module 408 is started, the IPP module 408 prepares a URL registration request and sends the same to the HTTPD module 404 (steps S1902, S1904).

Upon receiving the URL registration request from the IPP module 408 (step S2006), the HTTPD module 404 registers, in the URL table 1101, a URL, a port number, and the IPP module as a processing module which are designated by the request (step S2007), whereby the URL table 1101 is updated as shown in FIG. 13. Further, the port number 631 is added as a port for monitoring (step S2013), whereby the HTTPD module 404 monitors whether any request has arrived at the port numbered 631 (step S2001).

Further, if the SOAP Print Service is enabled, the SOAP module 406 sends a URL registration request to the HTTPD module 404, and the HTTPD module 404 receives the request, and then registers, in the URL table 1101 a URL, a port number, and the SOAP module 406 as a processing module which are designated by the request (steps S2006, S2007), whereby the URL table 1101 is updated as shown in FIG. 14. The port No. 80 designated by the URL registration request will not be newly added to the queue for multiple requests since it is already included for monitoring.

In the SOAP Print Service, a URL for a printing port is prepared in the <data-sink-uri> tag in the step S705 in FIG. 7, and a response is returned to the PC 103 in the following step S706, as mentioned above. The URL for the printing port (601 in FIG. 6) is similarly registered in the URL table 1101 of the HTTPD module 404 according to the procedure shown in FIG. 20. In this case, a URL deletion request is issued after the printing has been completed, and the registered URL for the printing port is then deleted from the URL table 1101 by this URL deletion request.

In this way, in the present embodiment, according to a request made by each of the processing modules 405, 406, and 408 that use HTTP, the HTTPD module 404 dynamically updates URLs and corresponding ports it monitors, whereby requests can be accepted from the LAN 100. As a result, it is not required that the HTTPD module 404 be re-built. Moreover, neither the power need be turned on/off nor need the HTTPD module 404 be restarted.

It is to be understood that the object of the present invention may also be achieved by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment described above, and hence the storage medium in which the program code is stored constitutes the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded by downloading from another computer, a database, or the like, not shown, connected to the Internet, a commercial network, a local area network, or the like.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A processing apparatus comprising:
   a communication device that receives data, using a receiving function of a socket layer, from at least one apparatus on a network using a predetermined protocol;
   a processing device that executes a plurality of processing modules that perform respective different processes on the data received from the at least one apparatus, wherein each of said processing modules determines whether the processing module is set for use, and sends a registration request to said communication device when each of said processing modules determines that the processing module is set for use;

a database memory device that stores process designating information for designating at least one process performed by at least one of said processing modules and a port number for receiving data to be processed by the at least one of said processing modules, wherein the database memory device stores the process designating information and the port number in association with the at least one of said processing modules;

wherein, when said communication device receives the data from the at least one apparatus, the processing device refers to said database memory device and specifies one of said processing modules that corresponds to the process designating information as a processing module that processes the data received from the at least one apparatus and processes the data received from the at least one apparatus with the specified processing module;

wherein, when said communication device receives the registration request from one of said processing modules that is set for use by also using the receiving function of the socket layer that is used to receive the data from the at least one apparatus, the processing device registers process designating information for designating a process performed by the one of said processing modules that is set for use and a port number for receiving data to be processed by the one of said processing modules that is set for use in said database memory device; and wherein the processing device refers to said database memory device and causes, in response to registration of a new port number, said communication device to initiate monitoring a port corresponding to the newly registered port number in order to wait for the data from the at least one apparatus.

2. The processing apparatus as claimed in claim 1, wherein the predetermined protocol is HTTP and the process designating information held in said database memory device further includes at least either one of a URL and a URI.

3. The processing apparatus as claimed in claim 1, wherein the process designating information further includes at least either one of a URL and URI and the database memory device stores a name of the at least one of said processing modules in order to associate the at least one of said processing modules with the process designating information and the port number.

4. The processing apparatus as claimed in claim 1, wherein the registration request is issued when the one of said processing modules that is set for use is activated.

5. The processing apparatus as claimed in claim 1, wherein the one of said processing modules that is set for use issues the registration request if a user selects a button for enabling the one of said processing modules to be set for use.

6. The processing apparatus as claimed in claim 1, further wherein the processing device deletes the process designating information corresponding to one of said processing modules set to be disabled, from said database memory device, based on a deletion request from the one of said processing modules set to be disabled.

7. A method of processing data for a processing apparatus comprising:

receiving data with a communication device, using a receiving function of a socket layer, from at least one apparatus on a network using a predetermined protocol;

executing a plurality of processing modules that perform respective different processes on the data received from the at least one apparatus with a processing device, wherein each of said processing modules determines whether the processing module is set for use, and sends a registration request to said communication device when each of said processing modules determines that the processing module is set for use;

storing process designating information for designating at least one process performed by at least one of said processing modules and a port number for receiving data to be processed by the at least one of said processing modules in a database memory device, wherein the database memory device stores the process designating information and the port number in association with the at least one of said processing modules;

wherein, when said communication device receives the data from the at least one apparatus, referring to said database memory device, specifying one of said processing modules that corresponds to the process designating information as a processing module that processes the data received from the at least one apparatus, and processing the data received from the at least one apparatus with the specified processing module;

wherein, when said communication device receives the registration request from one of said processing modules that is set for use by also using the receiving function of the socket layer that is used to receive the data from the at least one apparatus, processing designating information for designating a process performed by the one of said processing modules that is set for use and a port number for receiving data to be processed by the one of said processing modules that is set for use in said database memory device; and referring to said database memory device and causing, in response to registration of a new port number, said communication device to initiate monitoring a port corresponding to the newly registered port number in order to wait for the data from the at least one apparatus.

8. The method as claimed in claim 7, wherein the predetermined protocol is HTTP and the process designating information held in said database memory device further includes at least either one of a URL and a URI.

9. The method as claimed in claim 7, wherein the process designating information further includes at least either one of a URL and URI and the database memory device stores a name of the at least one of said processing modules in order to associate the at least one of said processing modules with the process designating information and the port number.

10. The method as claimed in claim 7, wherein the registration request is issued when the one of said processing modules that is set for use is activated.

11. The method as claimed in claim 7, further comprising deleting the process designating information corresponding to one of said processing modules set to be disabled, from said database memory device, based on a deletion request from the one of said processing modules set to be disabled.

12. A computer-readable storage medium storing a computer-executable program for performing a method of processing data for a processing apparatus, the method comprising:

receiving data with a communication device, using a receiving function of a socket layer, from at least one apparatus on a network using a predetermined protocol;

executing a plurality of processing modules that perform respective different processes on the data received from the at least one apparatus with a processing device, wherein each of said processing modules determines whether the processing module is set for use, and sends a registration request to said communication device when each of said processing modules determines that the processing module is set for use;

storing process designating information for designating at least one process performed by at least one of said processing modules and a port number for receiving data to be processed by the at least one of said processing modules in a database memory device, wherein the database memory device stores the process designating information and the port number in association with the at least one of said processing modules;

wherein, when said communication device receives the data from the at least one apparatus, referring to said database memory device, specifying one of said processing modules that corresponds to the process designating information as a processing module that processes the data received from the at least one apparatus, and processing the data received from the at least one apparatus with the specified processing module;

wherein, when said communication device receives the registration request from one of said processing modules that is set for use by also using the receiving function of the socket layer that is used to receive the data from the at least one apparatus, processing designating information for designating a process performed by the one of said processing modules that is set for use and a port number for receiving data to be processed by the one of said processing modules that is set for use in said database memory device; and referring to said database memory device and causing, in response to registration of a new port number, said communication device to initiate monitoring a port corresponding to the newly registered port number in order to wait for the data from the at least one apparatus.

* * * * *

UNITED STATES PATENT AND TRADEMARK OFFICE
CERTIFICATE OF CORRECTION

PATENT NO.           : 7,792,807 B2
APPLICATION NO. : 10/846866
DATED                   : September 7, 2010
INVENTOR(S)        : Ochiai It is certified that error appears in the above-identified patent and that said Letters Patent is hereby corrected as shown below:

Title page, Item (54) and at Column 1, lines 1-4, title

REMOVE: PROCESSING APPARATUS, DATA PROCESSING METHOD, PROGRAM FOR IMPLEMENTING THE METHOD, AND STORAGE MEDIUM

INSERT -- PROCESSING APPARATUS, DATA PROCESSING METHOD, PROGRAM FOR IMPLEMENTING THE METHOD, AND STORAGE MEDIUM THEREFOR --

Signed and Sealed this

Thirtieth Day of November, 2010

David J. Kappos
*Director of the United States Patent and Trademark Office*